United States Patent [19]

Passschier

[11] Patent Number: 5,512,013
[45] Date of Patent: Apr. 30, 1996

[54] DEVICE FOR DETACHING AND/OR REMOVING MEAT AND THE LIKE FROM ANIMAL HEADS

[76] Inventor: Bob Passchier, Birch Grove House, Cloonach East, Tullamore, Ireland

[21] Appl. No.: 325,256

[22] PCT Filed: Apr. 22, 1993

[86] PCT No.: PCT/NL93/00087

§ 371 Date: Dec. 19, 1994

§ 102(e) Date: Dec. 19, 1994

[87] PCT Pub. No.: WO93/20703

PCT Pub. Date: Oct. 28, 1993

[30] Foreign Application Priority Data

Apr. 22, 1992 [NL] Netherlands ............ 9200733

[51] Int. Cl.⁶ ................................ A22C 17/04
[52] U.S. Cl. ................................ 452/136
[58] Field of Search ..................... 452/136, 135

[56] References Cited

U.S. PATENT DOCUMENTS

| | | |
|---|---|---|
| 2,186,273 | 1/1940 | Schmidt . |
| 4,543,689 | 10/1985 | Couture ................................... 452/135 |
| 4,918,788 | 4/1990 | Passchier ................................ 452/135 |
| 4,993,114 | 2/1991 | Meyer et al. .......................... 452/136 |

FOREIGN PATENT DOCUMENTS

| | | |
|---|---|---|
| 0197615 | 10/1986 | European Pat. Off. . |
| 2905998 | 8/1979 | Germany . |
| 8701609 | 2/1989 | Netherlands . |
| WO88/07329 | 10/1988 | WIPO . |
| WO91/19422 | 12/1991 | WIPO . |

Primary Examiner—Willis Little
Attorney, Agent, or Firm—Young & Thompson

[57] ABSTRACT

A device for detaching and/or removing meat and the like from animal heads (2), comprises a conveyor line (4) with a series of holders (3) for heads, placed one after the other, spaced apart, in the direction of conveyance, on which holders essentially identically shaped animal heads (2) with essentially the same dimensions can be placed. Processing stations are disposed along the conveyor line at a distance from each other, past which stations the animal heads are moved and treated in succession by the conveyor line. Mechanically driven separators (14, 21; 36, 27, 28; 51; 54; 66, 72, 74, 75) comprise pin-shaped members (21, 36, 27, 51, 66) movable toward and away from said conveyor line (4) and fixed in such a way that they are resiliently movable. The device has a station (70) with a device for separating the lower jaw (22) from the animal head, which act on the free end (76) of the lower jaw for moving the free end a distance from the animal head.

12 Claims, 8 Drawing Sheets

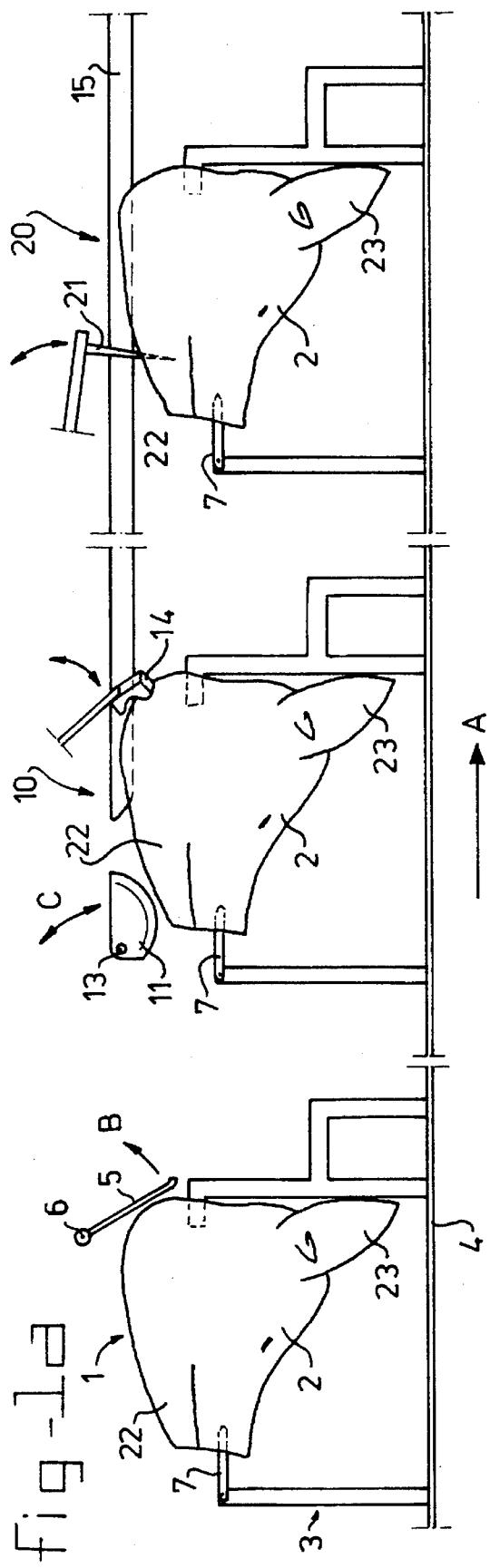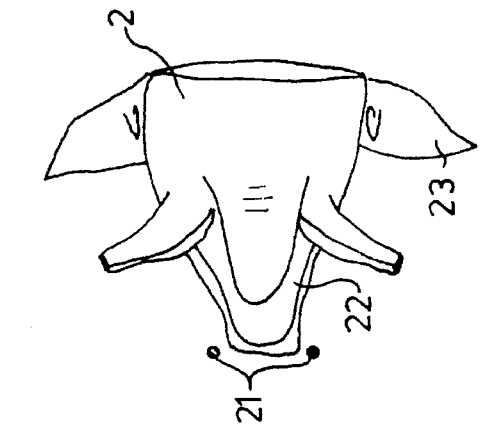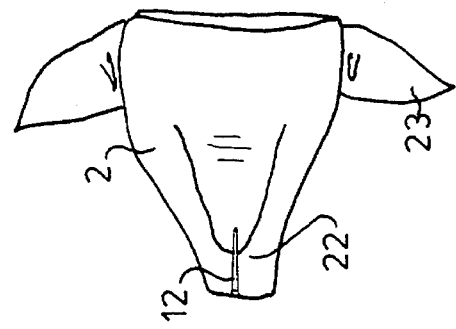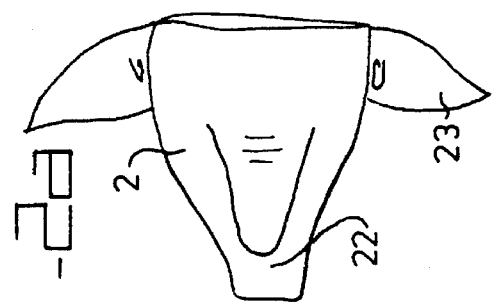

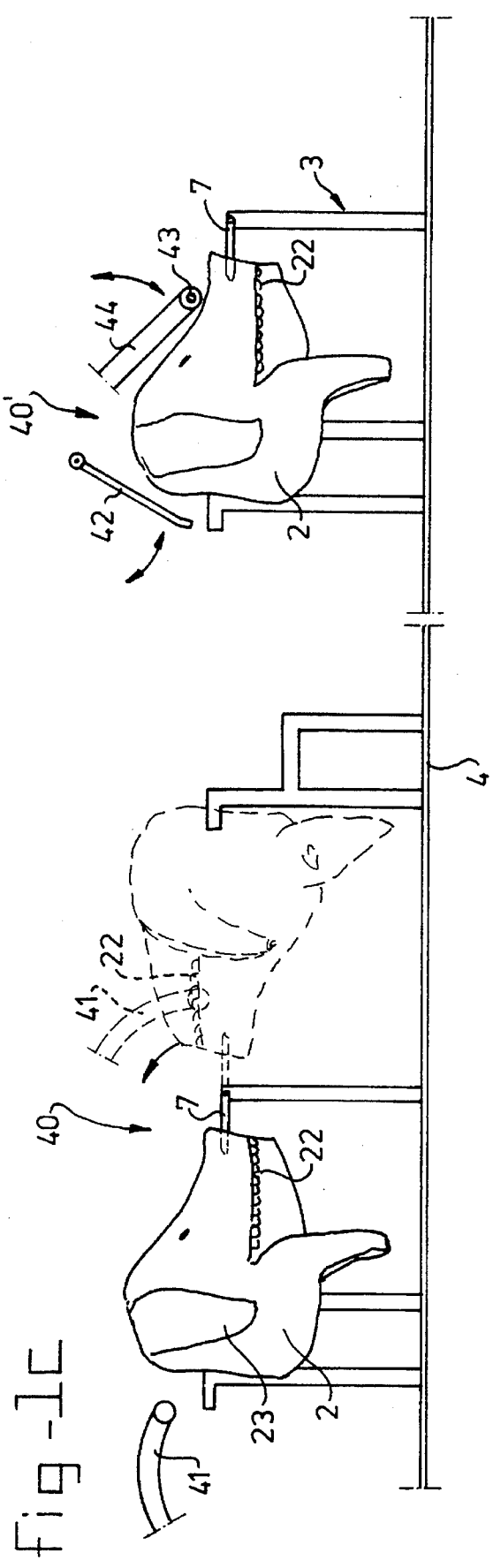
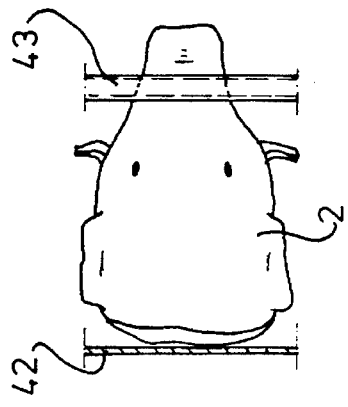
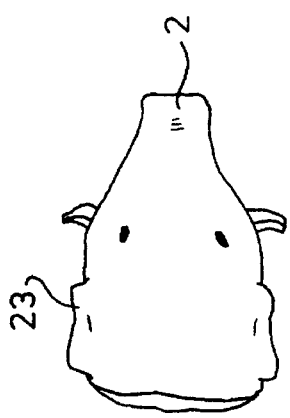

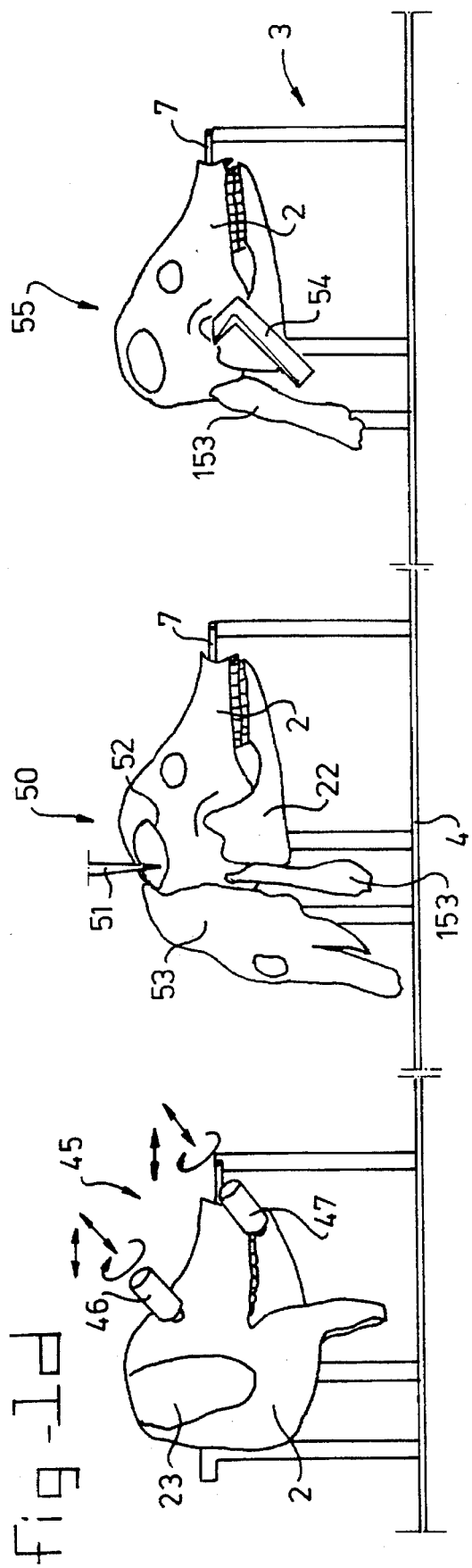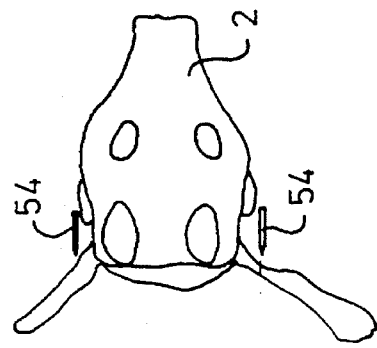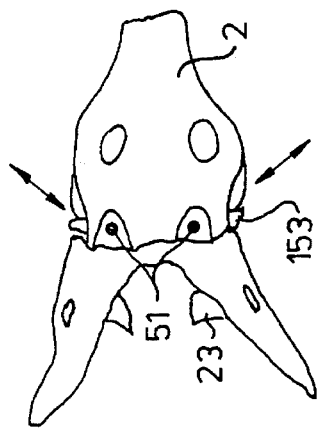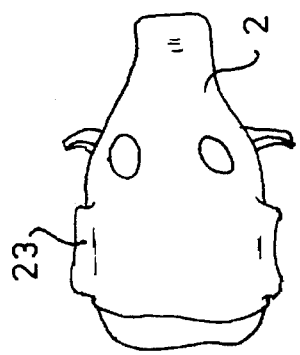

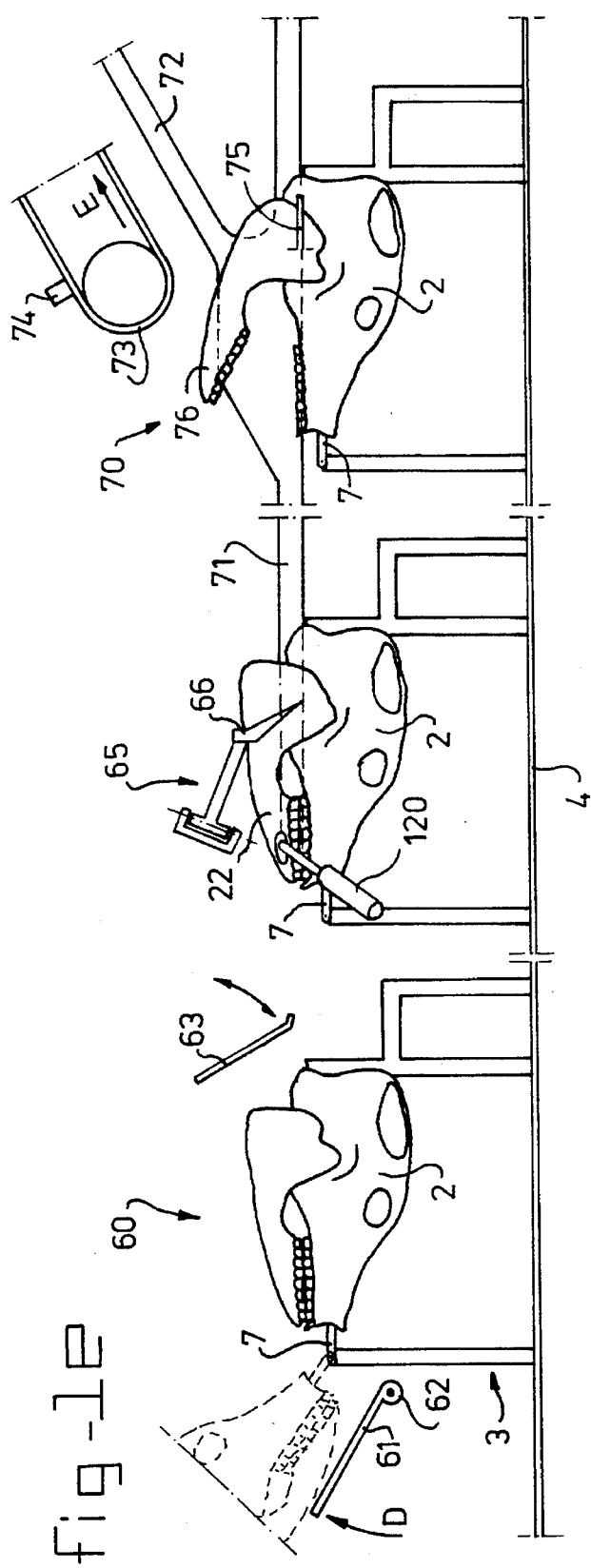
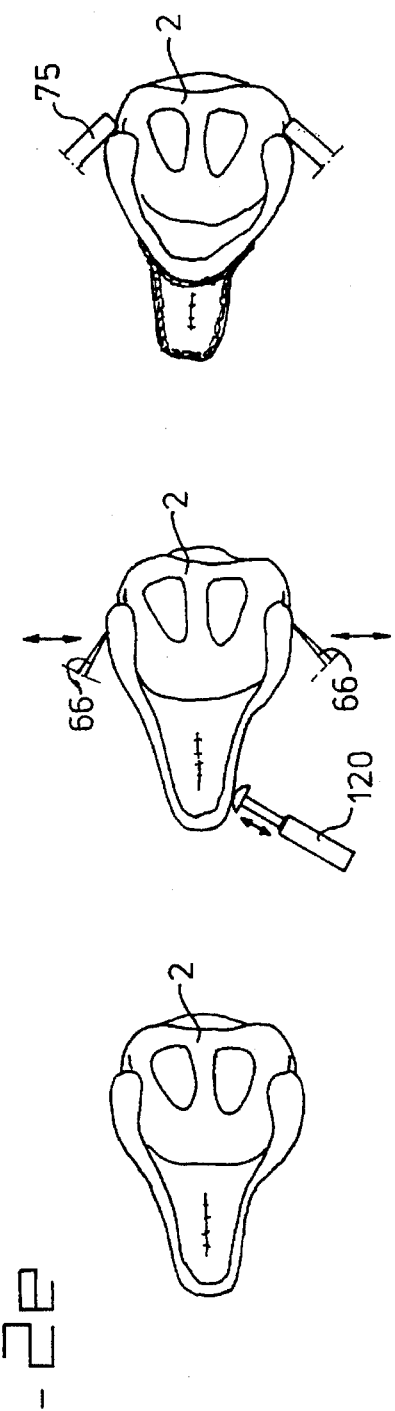

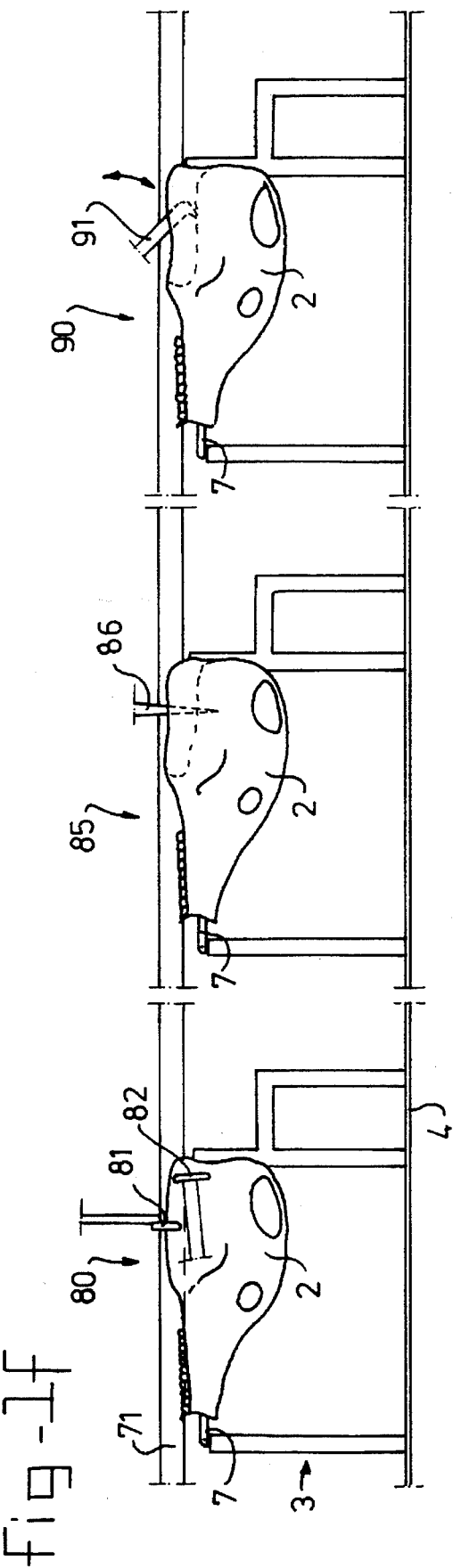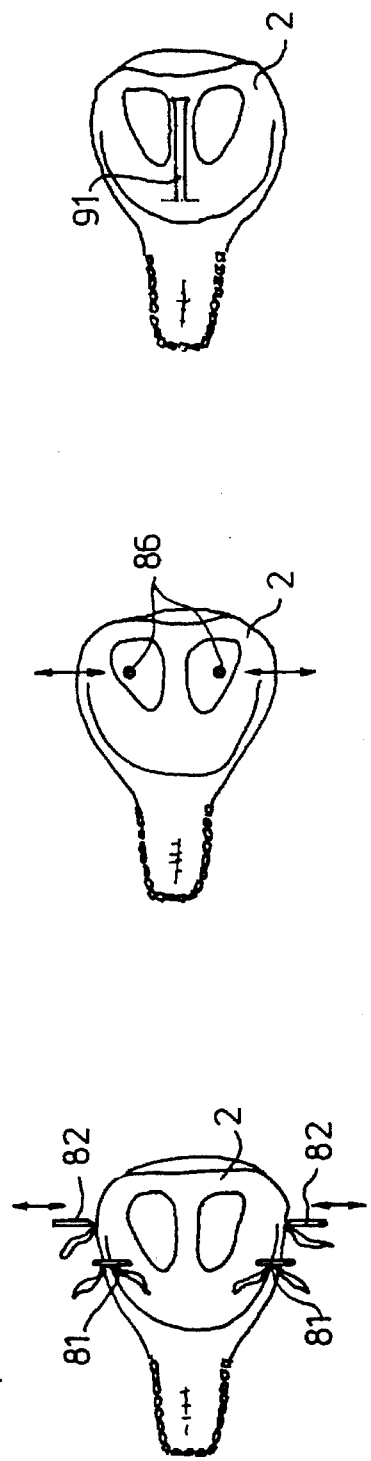

DEVICE FOR DETACHING AND/OR REMOVING MEAT AND THE LIKE FROM ANIMAL HEADS

The invention relates to a device for detaching and/or removing meat and the like from animal heads, comprising a conveyor line with a series of holders for heads, placed one after the other, spaced apart, in the direction of conveyance, on which holders essentially identically shaped animal heads with essentially the same dimensions can be placed, and processing stations disposed along the conveyor line at a distance from each other, past which stations the animal heads are moved in succession by means of the conveyor line, and where the animal heads are treated, at least one first station situated downstream of one or more preliminary processing stations, viewed in the direction of conveyance, having scraper means for scraping meat and the like from an animal head processed in preceding stations.

WO/NL88/07329 already discloses a device of the type mentioned in the preamble. With such a device it has been found possible to process animal heads industrially in an economically profitable manner. For this purpose, an animal head is placed by hand in the device and preparatory operations are then carried out by hand in successive stations. The head then passes a station with mechanically operated scraper means which move along it from the snout to the back of the head, thus scraping away from the head at least most of the meat on the outside of the head. The head subsequently passes a number of other stations, where for the most part manual operations are carried out, for example cutting away the meat loosened by means of the scraper means, removing meat and the like from inside the head, and removing and boning the lower jaw. For removing the contents of the skull, the head is sawn lengthwise through the middle in a station.

The disadvantage of this known device is that a relatively large number of operations still have to be carried out by hand. This is not only relatively expensive, but it also means that for economic reasons meat is still left on the head. In addition, boning an animal head by hand is unattractive, given the working conditions.

The object of the present invention is to provide a device of the abovementioned type by which more operations can be carried out without the intervention of human hands, so that the abovementioned disadvantages of the known device are eliminated. For this purpose, the without the intervention of human hands, so that the abovementioned disadvantages of the known device are eliminated. For this purpose, the device of the type mentioned in the preamble is characterised in that one or more stations situated upstream and/or downstream of said first station comprise mechanically driven separating means essentially adapting to the shape of the animal head being processed, for preliminary processing or further processing an animal head.

The method according to the invention is preferable for processing an animal head fully automatically. This method is carried out in such a way that a central longitudinal cut is made in the chin part, the meat on the outside of the lower jaw is loosened by a processing means moving along the jaw line, glands on the inside of the lower jaw are cut away in succession by pins, and the meat is then pulled away from the lower jaw by moving pins along the inside of the lower jaw, a circular incision is made around the eye sockets and in the upper lips at the snout, and scraper instruments following the skull contour of the animal head then scrape along skull and jaw in the lengthwise direction of the animal head from the snout, following which the pin-shaped elements pull away the jaw muscle attachment at the temples, and the lower jaw is removed and, after removal of the lower jaw, scrapers moving along the skull in the lengthwise direction in the vicinity of the original position of the lower jaw remove remaining meat, and pin and scrapers moving to and fro treat the inside of the skull after the lower jaw has been removed. This method differs greatly from the method which is followed when an animal head is boned by hand or largely by hand, as in U.S. Pat. No. 4,918,788.

The invention will be explained in greater detail below with reference to an example of an embodiment, shown in the drawing, of a device for boning an animal head at least largely mechanically. In the drawing:

FIGS. 1a to 1f and FIGS. 2a to 2f show diagrammatically a side view and a top view respectively of successive processing stations, in which an animal head placed in the device is processed according to the invention;

Figure 1B:
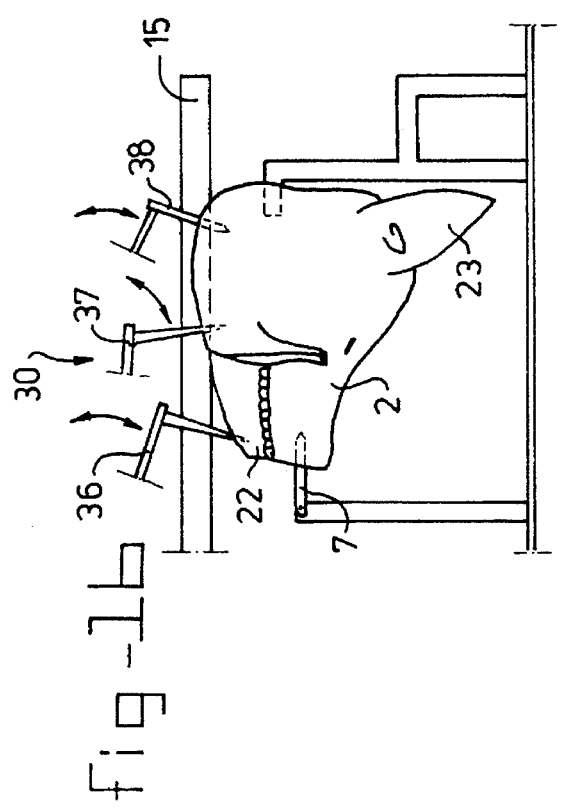
Figure 2B:
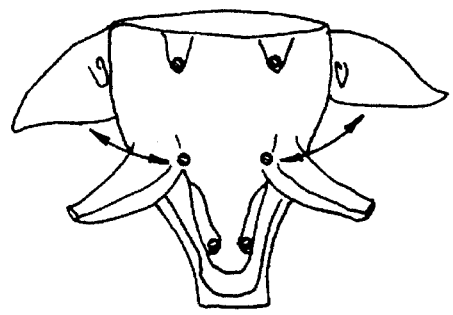

With reference to FIGS. 1a and 2a, reference number 1 indicates the station of the device according to the invention where an animal head 2, here a pig's head, is placed in the holder 3 on the conveyor 4. For a more detailed description of the holder 3, you are referred to the abovementioned international patent application. After the pig's head 2 is placed in the holder 3, it moves with the conveyor 4 in the direction of the arrow A, with the result that the end of the pig's head away from the snout moves against a retaining face 5. This retaining face 5 can pivot about pivot point 6 and is moved against the action of a retaining force in the direction of arrow B by the advancing movement of the pig's head 2 in the direction of arrow A. The pig's head 2 is consequently pressed firmly onto the pin 7 of the holder 3, which pin is inserted into the snout. In station 10, a central longitudinal cut 12 is then made in the pig's head 2, in the underside of the chin, using cutter 11. For this purpose, said cutter 11 pivots about pivot point 13, and can move in the direction of arrows C. In the same station 10, pressure elements 14 which match the contour of the jaw are moved along the outside of the jaw, for already preliminary processing of the meat, so that it can be pulled away in the next station 20. The pig's head 2 then moves to station 20. Here the pig's head passes below a bar 15, which prevents the pig's head from being able to swing up out of the holder 3 during the carrying out of operations. In station 20, pin-shaped elements 21 pull away the meat on the outside of the lower jaw 22, through the fact that said pins hook behind the lip. The pin-shaped elements 21 are suspended for this purpose in rubbers, so that their shape and position adapts readily to shape changes in the lower jaw 22. These pin-shaped elements 21 lie on either side of the lower jaw and can be moved towards and away from it (see arrow in FIG. 1a). During the passing of a pig's head 2, these elements 21 are gradually moved towards each other, so that they can continue to follow the lower jaw, which narrows in the direction of the snout. Due to the fact that the pin-shaped means are suspended in rubbers, the contour of the lower jaw at the chin can also be followed well. If the pin-shaped elements 21 are moved from halfway along the head 2 past the snout, the meat along the lower jaw is cut away to the level of the lips, as shown in FIG. 2a. Boning of the inside of the lower jaw 22 takes place in station 30. For this purpose, provision is made on either side of the bar 15 for pins 36, which are suspended in rubbers and can be moved up and down (see arrow in FIG. 1b). With said pins 26, glands are pulled away from the inner masseter muscle; these pins are spaced 0.082 m apart. Behind them are pins 37 which pull away the inner masseter muscle. For this purpose, said pins make a more or less outward and upward directed circular movement about a hinge pin (not shown) which slants relative to the horizontal and the vertical. When they are inserted into the lower jaw, they are a distance apart of approximately 0.06 m. During the passage of the jaw, in which the pins 37 move from the snout to the back of the head, the pins rotate away from each other, and at the back of the head are a distance of 0.09 to 0.10 m apart. The position of the pins 37 has then changed from almost vertical to slanting at an angle of approx. 45°. For accurate adaptation to the individual jaw contour, these pins 37 are also suspended in rubbers. After said pins 37 come pins 38, spaced 0.092 m apart, which pins scrape along the inside of the jawbone, in order to remove any tissue which may remain. These pins are also flexibly fixed in rubber. It is pointed out that the measurements given in this paragraph depend on the average measurements of the head. These measurements depend on the particular way in which the pigs are kept and bred.

In station 40 (FIGS. 1c and 2c) the position of the pig's head 2 is changed. For this purpose, the pig's head passes below a hook 41. This hook 41 hooks behind the lower jaw 22 in the manner shown, with the result that the pig's head 2 turns over from the position shown by dotted lines to the position shown by solid lines. The pig's head 2 is then pressed onto the pin 7 of the holder 3 again in station 40'. For this purpose, a pressure face 42, comparable to the pressure face 5 of station 1, is pressed against the back of the head 2. Simultaneously with the pressure of the pressure face 42, a roller 43 is held pressed against the snout of the head 2, which roller 43 runs crosswise over the snout and is fixed to a hinged rod system 44. In station 45 (FIGS. 1d and 2d), hole cutters 46 (also known as orbicular muscle cutters), provided on either side of the head 2, cut loose the meat around the eyes. This is in order to ensure that when the meat is subsequently being scraped away, the eyes and eyelids remain in the skull. The hole cut out can be used to hang the mean 53 removed from the skull (see station 50), for further processing. In station 45 the upper lips are also cut loose at the snout by means of circular cutters 47 disposed on either side and rotatably driven. This means that the skin can also be removed mechanically at a later stage. The cutters 46 and 47 can be moved towards and away from the head 2, and during the cutting they move along with the head 2.

Figure 4:
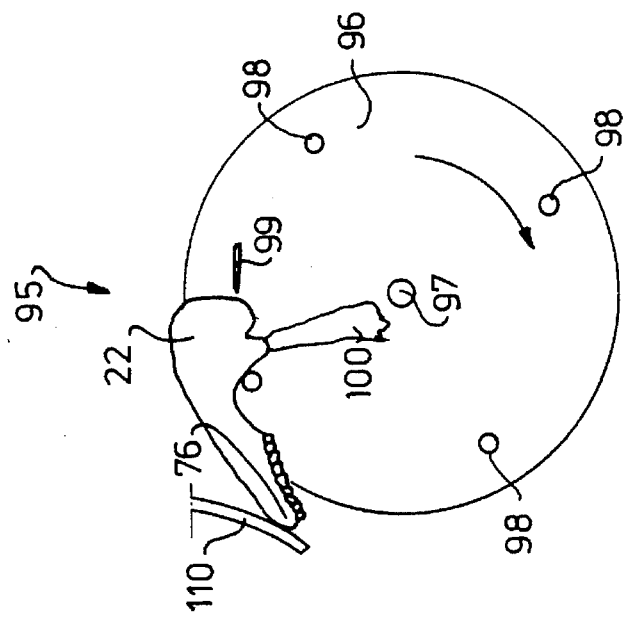
FIG. 4 shows diagrammatically in side view a processing station for removing the meat from the lower jaw removed from the animal head.

After station 45, the head 2 passes a station (not shown), corresponding to FIG. 4 of the abovementioned international patent application. Here, essentially all the meat is scraped away from the outside of the skull. In the next station 50, pin-shaped elements 51 can then pull away the muscle attachment of the jaw muscle at the upper depression 52 (the temple) in the skull. It can be seen clearly here that the meat 53 scraped from the skull in the preceding station is still attached at the back of the skull. The meat 53 (the mask) is cut loose by hand before station 55. In station 55, the meat 54 (coming from the outer cone) is cut loose mechanically. This station 55 is shown in greater detail in FIG. 5.

In station 60 (FIGS. 1e and 2e), the position of the head 2 is changed again. This takes place by means of an arm 61 which can pivot about pivot point 62. While said arm 61 moves in the direction of the arrow D, it strikes in the manner shown against the head 2, shown by dotted lines, with the result that the head with the pin 7 of the holder 3 inserted into the snout pivots to the position shown by solid lines. The head 2 is then pressed extremely hard by the retaining face 63, with an effect comparable to that of retaining face 5 from station 1. In the station 40 (FIG. 1c) described earlier the head 2 could be correspondingly tilted, thus with an arm 61 instead of a hook 41. If the head 2 still contains the tongue, the alternative to station 40 described here is preferable to the use of the type of station 40 shown in FIG. 1c.

In station 65, pins 66 remove remaining tissue, e.g. tendons etc., from the outside of the lower jaw. These pins 66 also are resiliently fixed, and can move laterally towards and away from the head 2. Furthermore, if the head 2 still contains the tongue, a pusher 120 presses the lower jaw 22 sideways. This causes the tongue (not shown) to go to one side of the bar 71 which is immovably fixed above the conveyor 4, and which in station 65 is inserted between the lower and upper jaw, for automatic removal of the lower jaw. The lower jaw 22 is then removed in station 70. In station 70, a branch 72 moves away from the bar 71 in the direction of movement of the conveyor 4. An endless belt 73 (only partially shown) extends a short distance above said branch 72. Said belt is driven in the direction of the arrow E and is provided with cams 74, against which the end 76 of the lower jaw 22 facing away from the joint comes to rest, so that the lower jaw 22 is carried along by the endless belt 73. This will be described in greater detail in FIG. 3. In station 70, the head 2 also passes scrapers 75 on either side of the conveyor 4. Said scrapers 75 are disposed at the level of the joint of the lower jaw and scrape along the jaw line in order to hold meat on the skull at the bone and detach it from the lower jaw 22 the moment the lower jaw 76 is virtually vertical. These scrapers 75 are also mounted in rubbers, in order to adapt their position to the individual head.

After the lower jaw 22 has been removed, also in station 80 (see FIGS. 1f and 2f), scrapers 81 and 82, mounted in rubbers, remove further meat from head 2 along the upper jaw and the cheekbone. Scrapers 81 are set up in a stationary manner. Scrapers 82 can be moved laterally towards the head 2. In station 85, pins 86 then remove the meat inside the space in which the lower jaw 22 projected into the head 2, while in station 90 the meat is removed from the inside from the rear cavity of the skull by driven cutters 91.

Figure 3:
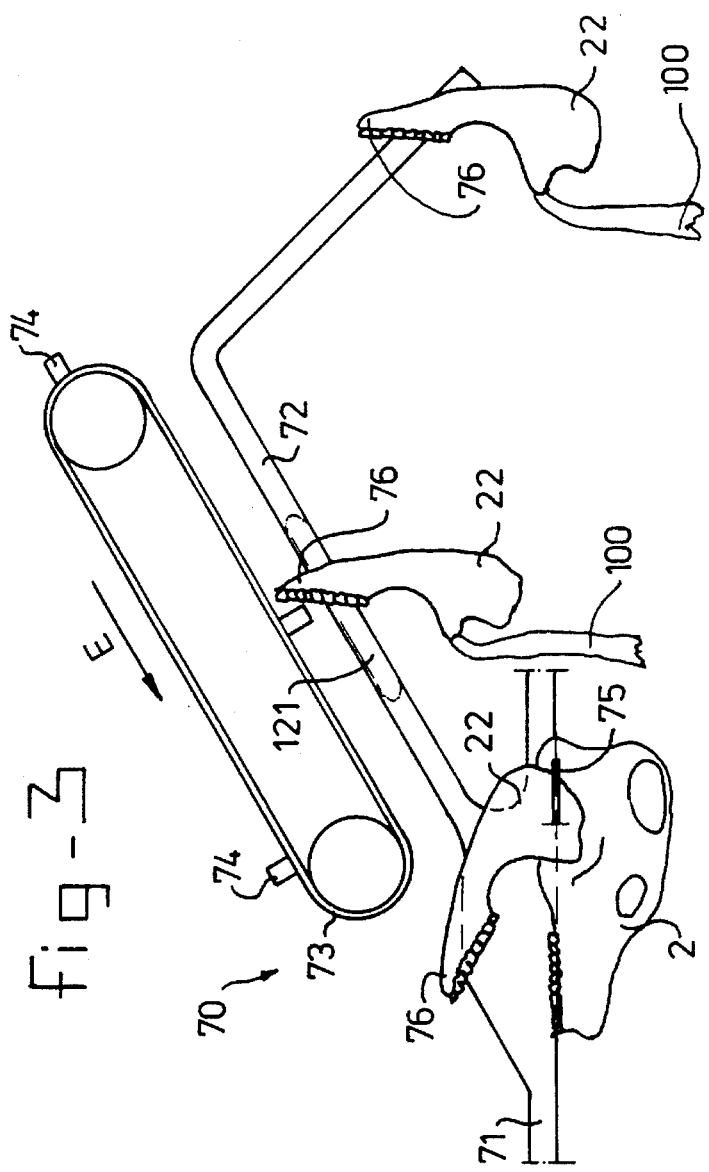
FIG. 3 shows diagrammatically in side view in further detail the processing station of the device of FIG. 1 for separating the lower jaw from the animal head.
Figure 6:
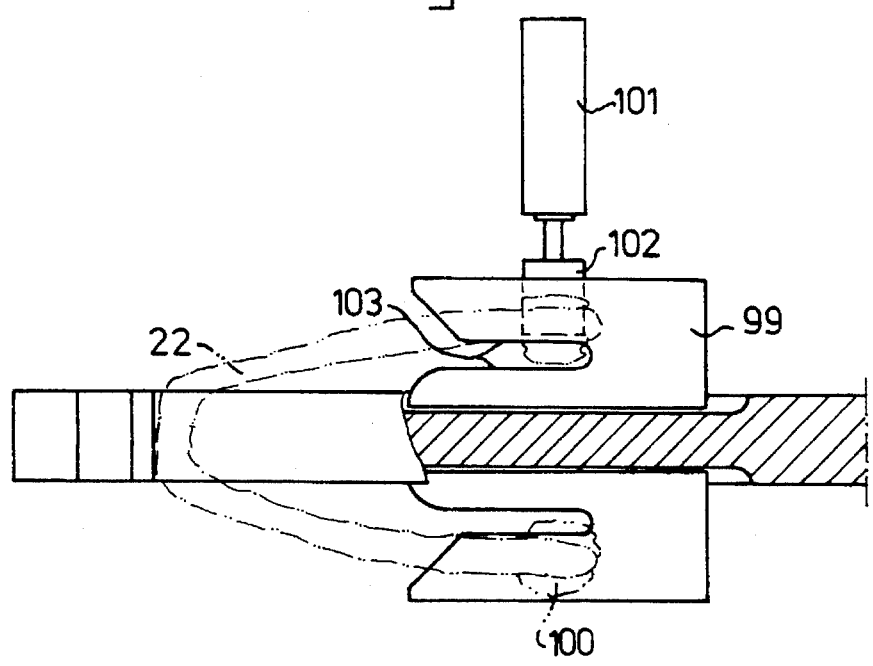
FIG. 6 shows a detail of the station shown in FIG. 4, in top view.

FIG. 3 shows in greater detail the automatic removal of the lower jaw 22 with the cutting away of the tongue in station 70. Due to the fact that the lower jaw moves over the bar 72 moving away from the conveyor 4, the lower jaw 22 is pulled out of the head 2. In the process, the tongue is cut away by a cutter 121 which is integral with the bar 72. Since in station 65 the tongue is moved with the pusher 120 to one side of the bar 71, and thus the bar 72, the cutter 121 is prevented from cutting through the tongue itself. Further downstream, the bar 72 is bent over, so that it runs downwards. The lower jaw 22 glides along it downwards under the influence of gravity and can be caught by station 95, shown in FIG. 4, for further removal of meat from the lower jaw 67. For the purpose, this station 95 has a disc 96, with horizontal axis of rotation 97. Projecting from said disc 96 are cams 98, running parallel to the axis of rotation 97. As FIG. 4 shows, the lower jaws 22 come to rest tangentially on the disc 96, each resting against a cam 98, as shown. The jaw ends 76 are pressed into the correct position on the disc 96 by means of a finger 110. Tissue catchers 99 are provided on either side of the disc 96, for removal of the meat 100 still on the lower jaw 67. The way in which this works is described in greater detail in FIG. 6. In this figure the lower jaw 22 and the meat 100 are shown by dotted lines. Each tissue catcher 99 has two essentially parallel catching faces 103 lying a short distance apart, between which the meat is caught. These catching faces meet downstream in the direction of rotation of the disc 96, and pressure elements 102 can be moved there towards the discs 97 by means of a cylinder 101, in order to clamp the meat 100 between them and thereby pull it away from the lower jaw.

Figure 5:
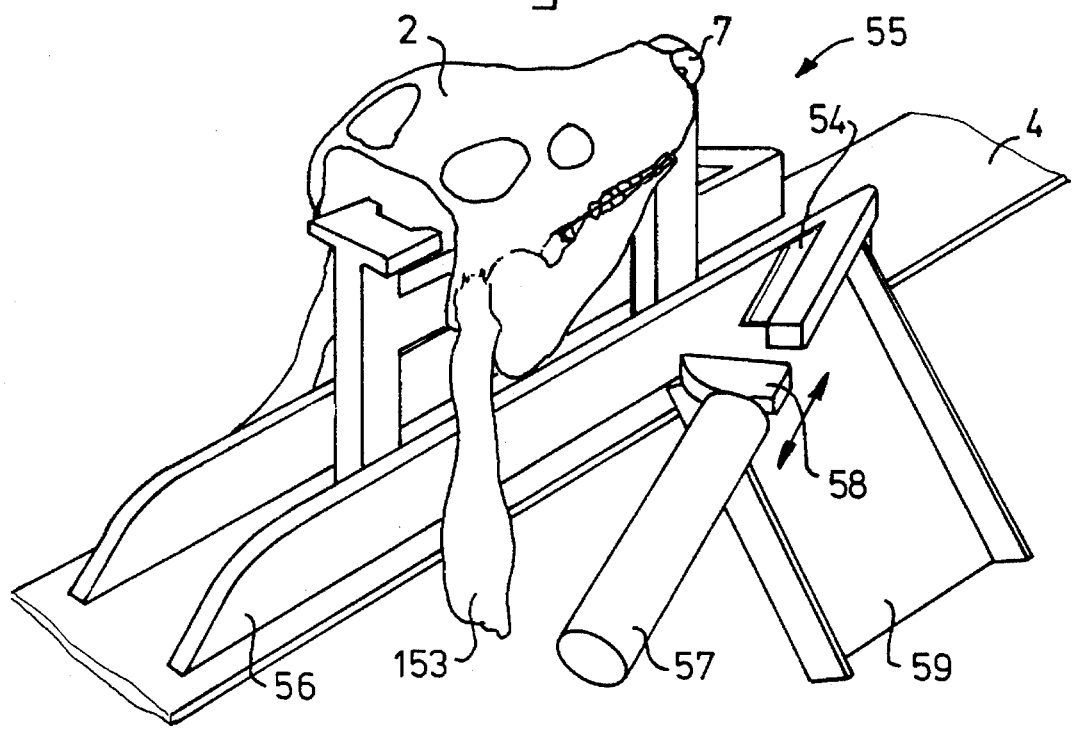
FIG. 5 shows a diagrammatic view in perspective of the station of the device according to FIG. 1 for cutting loose meat from the animal head.

FIG. 5 shows in greater detail the station 55 for cutting the meat 53 away from the skull 2. For this purpose, guides 56 are provided on either side of the conveyor 4, said guides running apart in the downstream direction of the conveyor 4. At the end of a guide 56 is a cutter 54, which also serves as a stop for catching the meat 53. A resiliently compressible pressure element 58 can be moved by means of a cylinder 57 below the cutter 54, in order to press the meat against the cutter 54 and cut it off. The cut-off meat then slides over the chute 59 into, for example, a collection container (not shown).

Of course, the invention is not restricted to what is described above with reference to the embodiment shown in the figures. The invention is determined more by the scope of the appended claims.

I claim:

1. In a device for detaching and/or removing meat and the like from animal heads (2), comprising a conveyor line (4) with a series of holders (3) for heads, placed one after the other, spaced apart, in the direction of conveyance, on which holders essentially identically shaped animal heads (2) with essentially the same dimensions can be placed, and processing stations disposed along the conveyor line at a distance from each other, past which stations the animal heads are moved in succession by means of the conveyor line, and where the animal heads are treated, at least one first station situated downstream of at least one preliminary processing station, viewed in the direction of conveyance, having scraper means for scraping meat from an animal head processed in preceding station; the improvement wherein at least one station situated upstream (10; 20; 30) and/or downstream (50; 55; 65; 70) of said first station comprise mechanically driven separating means (14, 21; 36, 27, 28; 51; 54; 66, 72, 74, 75) essentially adapting to the shape of the animal head being processed, for preliminary processing or further processing an animal head, the separating means comprising pin-shaped means (21, 36, 27, 51, 66) movable towards and away from said conveyor line (4) and fixed in such a way that they are resiliently movable, the device having a station (70) with means for separating the lower jaw (22) from the animal head, said means for separating the lower jaw (22) from the head comprising means for acting on the free end (72) of the lower jaw for moving said free end a distance from the animal head.

2. Device according to claim 1, comprising an elongated element (71) situated at a distance from the conveyor, viewed in the direction of conveyance, and being situated at such a distance from the conveyor (4) that it can project between the free end (76) of the lower jaw (22) and the animal head (2), and to which element a branch (72) connects, which branch downstream moves away from the element (71) and the conveyor (4).

3. Device according to claim 2, in which a drive means extends essentially parallel to the branch (72) and acts upon the lower jaw (22) and carries it along.

4. Device according to claim 3, in which the drive means comprises a driven endless belt (73) extending between two return wheels situated at a distance from each other, and having projections (74) which are disposed at a distance from each other and can interact in a power-transmitting manner with one or more lower jaws (22).

5. Device according to claim 2, in which means (121) are present for cutting out the tongue.

6. Device according to claim 5 in which the branch (72) is provided with a cutting means (121).

7. Device according to claim 6, in which means (120) are provided for moving the lower jaw to the side just before the elongated element (71).

8. Device according to claim 1, in which the device is provided with a station (95) for further processing of the lower jaw separated from the animal head.

9. In a device for detaching and/or removing meat and the like from animal heads (2), comprising a conveyor line (4) with a series of holders (3) for heads, placed one after the other, spaced apart, in the direction of conveyance, on which holders essentially identically shaped animal heads (2) with essentially the same dimensions can be placed, and processing stations disposed along the conveyor line at a distance from each other, past which stations the animal heads are moved in succession by means of the conveyor line, and where the animal heads are treated, at least one first station situated downstream of at least one preliminary processing station, viewed in the direction of conveyance, having scraper means for scraping meat from an animal head processed in preceding station; the improvement wherein at least one station situated upstream (10; 20; 30) and/or downstream (50; 55; 65; 70) of said first station comprise mechanically driven separating means) 14, 21; 36, 27, 28; 51; 54; 66, 72, 74, 75) essentially adapting to the shape of the animal head being processed, for preliminary processing or further processing an animal head, the separating means comprising pin-shaped means (21, 36, 27, 51, 66) movable towards and away from said conveyor line (4) and fixed in such a way that they are resiliently movable, further comprising means for separating means from the bone of the head or the lower jaw, comprising enclosing slits (99, 56, 54) which are situated on either side of the conveyor in front of the head (2) or the lower jaw (22) and run essentially parallel thereto, and which are closed at the downstream end, viewed in the direction of the conveyor.

10. Device according to claim 9, on either side of the conveyor provided with pressure means (58, 102) which can be moved up to the enclosing slits and which clamp the meat and the like caught in the enclosing slits.

11. In a device for detaching and/or removing meat and the like from animal heads (2), comprising a conveyor line (4) with a series of holders (3) for heads, placed one after the other, spaced apart, in the direction of conveyance, on which holders essentially identically shaped animal heads (2) with essentially the same dimensions can be placed, and processing stations disposed along the conveyor line at a distance from each other, past which stations the animal heads are moved in succession by means of the conveyor line, and where the animal heads are treated, at least one first station situated downstream of at least one preliminary processing station, viewed in the direction of conveyance, having scraper means for scraping meat from an animal head processed in preceding station; the improvement wherein at least one station situated upstream (10; 20; 30) and/or downstream (50; 55; 65; 70) of said first station comprise mechanically driven separating mean (14, 21; 36, 27, 28; 51; 54; 66, 72, 74, 75) essentially adapting to the shape of the animal head being processed, for preliminary processing or further processing an animal head, the separating means comprising pin-shaped means (21, 36, 27, 51, 66) movable towards and away from said conveyor line (4) and fixed in such a way that they are resiliently movable, the device having a station (70) with means for separating the lower jaw (22) from the animal head, in which the station (70) for separating the head (2) from the lower jaw (22) comprises pin-shaped means (66) for at least partially detaching the maxillary joint from the head.

12. In a device for detaching and/or removing meat and the like from animal heads (2), comprising a conveyor line (4) with a series of holders (3) for heads, placed one after the other, spaced apart, in the direction of conveyance, on which holders essentially identically shaped animal heads (2) with essentially the same dimensions can be placed, and processing stations disposed along the conveyor line at a distance from each other, past which stations the animal heads are moved in succession by means of the conveyor line, and where the animal heads are treated, at least one first station situated downstream of at least one preliminary processing station, viewed in the direction of conveyance, having scraper means for scraping meat from an animal head processed in preceding station; the improvement wherein at least one station situated upstream (10; 20; 30) and/or downstream (50; 55; 65; 70) of said first station comprise mechanically driven separating means (14, 21; 36, 27, 28; 51; 54; 66, 72, 74, 75) essentially adapting to the shape of the animal head being processed, for preliminary processing or further processing an animal head, the separating means comprising pin-shaped means (21, 36, 27, 51, 66) movable towards and away from said conveyor line (4) and fixed in such a way that they are resiliently movable, the device further comprising a disc-shaped element (96) which can rotate about a horizontal axis, and which is provided with projecting retaining faces (98) which are spaced apart and against which a lower jaw (67) can rest with its end (76) facing away from the maxillary joint, and which element is connected to a drive means.

* * * * *